United States Patent [19]

Gaghan

[11] 3,833,980

[45] Sept. 10, 1974

[54] ROLL FOR APPLYING PRESSURE
[75] Inventor: Stephen B. Gaghan, Franklin Lakes, N.J.
[73] Assignee: Van Vlaanderen Machine Company, Inc., Patterson, N.J.
[22] Filed: Apr. 27, 1973
[21] Appl. No.: 355,305

[52] U.S. Cl. .......................................... 29/116 AD
[51] Int. Cl. ............................................ B21b 13/02
[58] Field of Search ................................ 29/116 AD

[56] References Cited
UNITED STATES PATENTS

| 2,138,397 | 11/1938 | Cannity | 100/170 X |
| 2,738,663 | 3/1956 | Moore | 100/170 X |
| 3,606,645 | 9/1971 | Vignon | 29/116 AD X |
| 3,624,880 | 12/1971 | Justus et al. | 29/116 AD |
| 3,638,292 | 2/1972 | Gaghan | 29/116 AD X |
| R26,219 | 6/1967 | Kusters et al. | 29/116 AD X |

Primary Examiner—Alfred R. Guest
Attorney, Agent, or Firm—Cushman, Darby & Cushman

[57] ABSTRACT

A roll for applying pressure comprising two shafts, a stationary inner structure mounted between the shafts, a slot extending substantially throughout the length of the inner structure, a rotatable outer cylinder surrounding the inner structure, means mounted on each shaft to rotatably support the outer cylinder, an inner roller disposed within the slot defined in the inner structure, said slot being substantially parallel to the axis of rotation of the outer cylinder, means for sealing the inner roller in the slot to form a chamber adapted to contain a pressurizing fluid, a fluid passage means for supplying fluid through one of the shafts into the chamber, said chamber and inner structure being adapted by the force of the fluid to urge the inner roller against an inner surface of the rotatable outer cylinder, and means for applying a force to the roll whereby the outer cylinder is urged toward the opposing surface.

8 Claims, 6 Drawing Figures

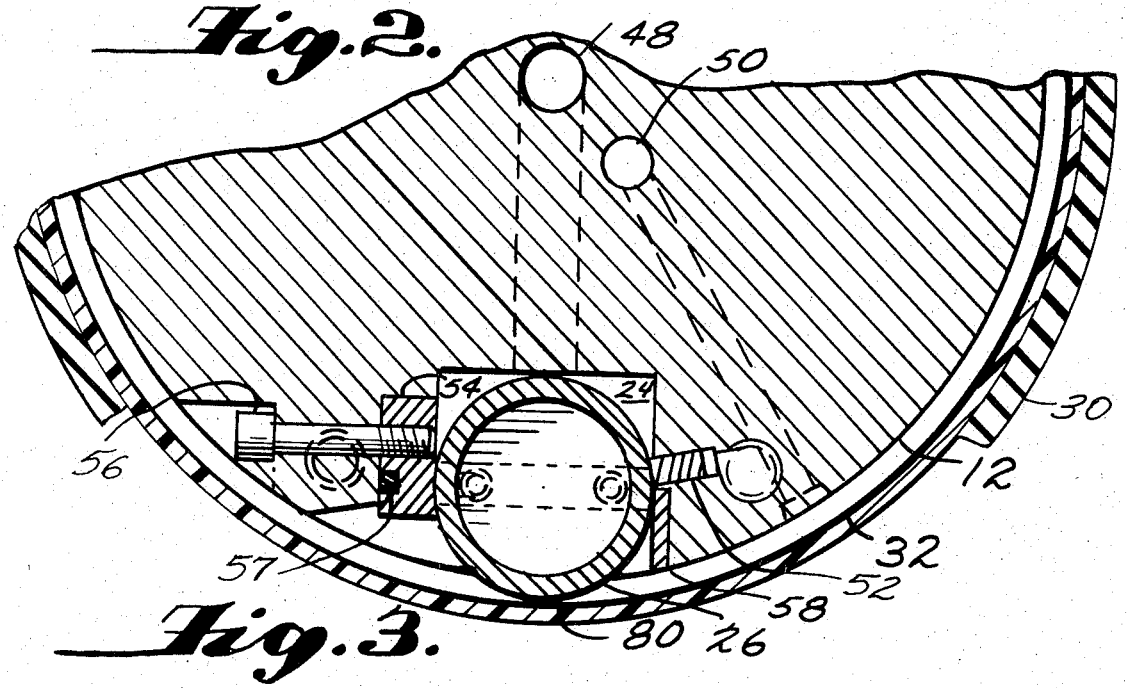
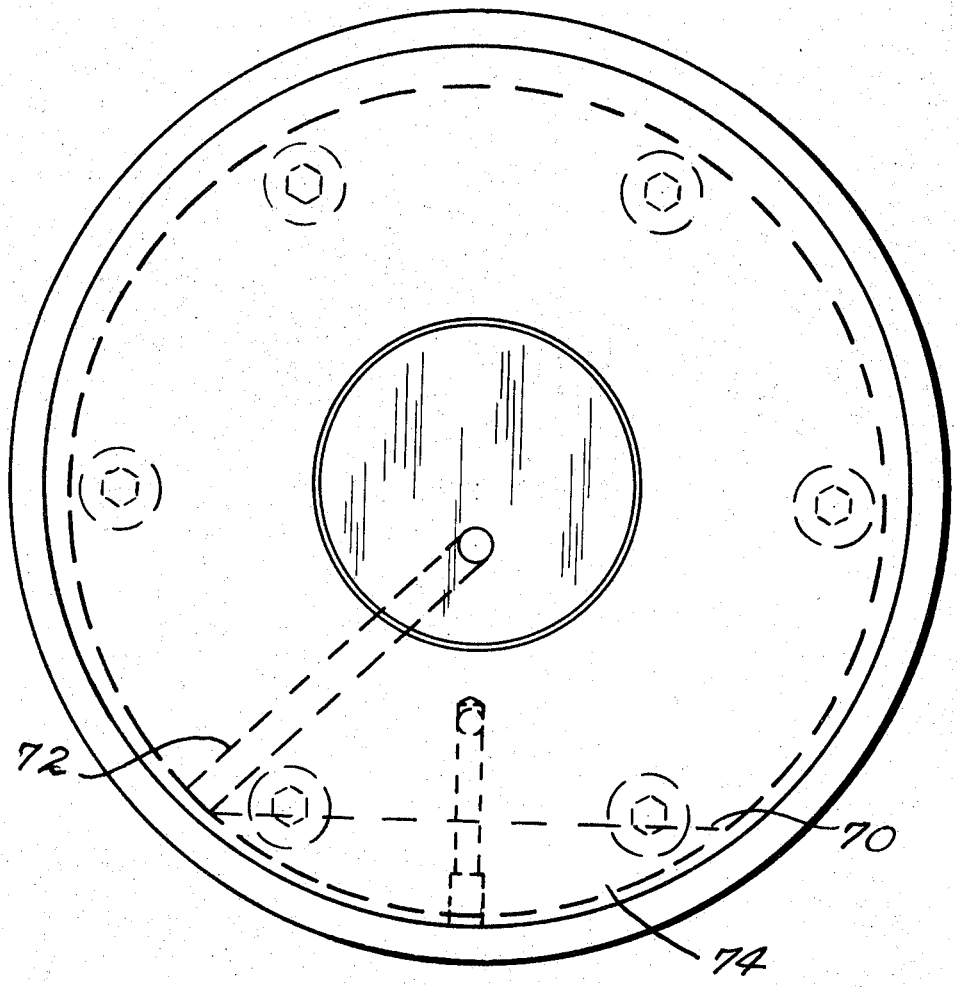

ROLL FOR APPLYING PRESSURE

BACKGROUND OF THE INVENTION

The present invention relates to a roll for applying uniform pressure to a web of material in textile processing such as padding after dyeing, and more particularly to a novel and highly effective non-deflecting roll having a stationary inner structure and a rotatable outer structure, said inner structure comprising a hydraulic chamber for applying uniform pressure to the outer roll.

Prior art textile processing rollers, as evidenced by the U.S. Pat. to Kusters et al, No. Re. 26,219, have employed the whole inner chamber inside a rotating outer structure in which to apply a hydraulic fluid pressure. The problem with this type of roller is that because of the large area of the hydraulic pressure, the outer roller tends toward ovality which thus reduces the pressure per area transmitted to the opposing surface.

Deflection of the outer rotating structure against the textile material and the opposing roller may be controlled by means of an inflated inner bag which transmits the pressure to a series of inner rollers disposed in a slot formed in an inner stationary structure, as evidenced by my U.S. Pat. No. 3,638,292. Although the roll of this patent applies a uniform pressure, the construction of the roll is relatively complex and heavy and, additionally, uses a series of point contacts for applying pressure to the outer rotating structure.

It is therefore the object of this invention to provide a sharper squeeze between the roll and the opposing textile surface or roller.

It is further an object of the present invention to provide precise uniform line of contact to transmit pressure from an inner stationary roll to an outer rotating structure.

It is additionally an object of this invention to provide a roll which applies a uniform pressure which is also of a lighter and more simple construction and therefore cheaper to manufacture.

It is further an object of this invention to provide a roll which applies a more uniform control of the applied pressure.

SUMMARY OF THE INVENTION

The above objects are obtained by a roll for applying uniform pressure to a web of material which comprises two support shafts, a stationary inner structure mounted between the two shafts and a cylindrical outer structure surrounding the stationary inner structure and rotatably mounted on the shafts. An inner roller is provided in a slot defined in the inner structure and is arranged to contact the inner surface of the rotating outer structure. This roller is sealed to form a hydraulic fluid chamber within the slot in the inner stationary structure. Passages are provided in the shafts and inner structure in order to transmit the hydraulic fluid to the hydraulic chamber. In this manner, the pressure on the hydraulic fluid may be controlled to transmit the pressure from the inner roller to the outer rotating structure and eventually to an opposing surface.

BRIEF DESCRIPTION OF THE DRAWINGS

Additional aspects of the invention can be understood from the following detailed description of representative embodiments of the invention. In connection with the drawings:

FIG. 2 is a sectional side elevation of the roll in FIG. 1 taken along line A—A;

FIG. 3 is a sectional side elevation of the roll shown in FIG. 1 taken along the line B—B;

DESCRIPTION OF THE PREFERRED EMBODIMENT

Figure 1:
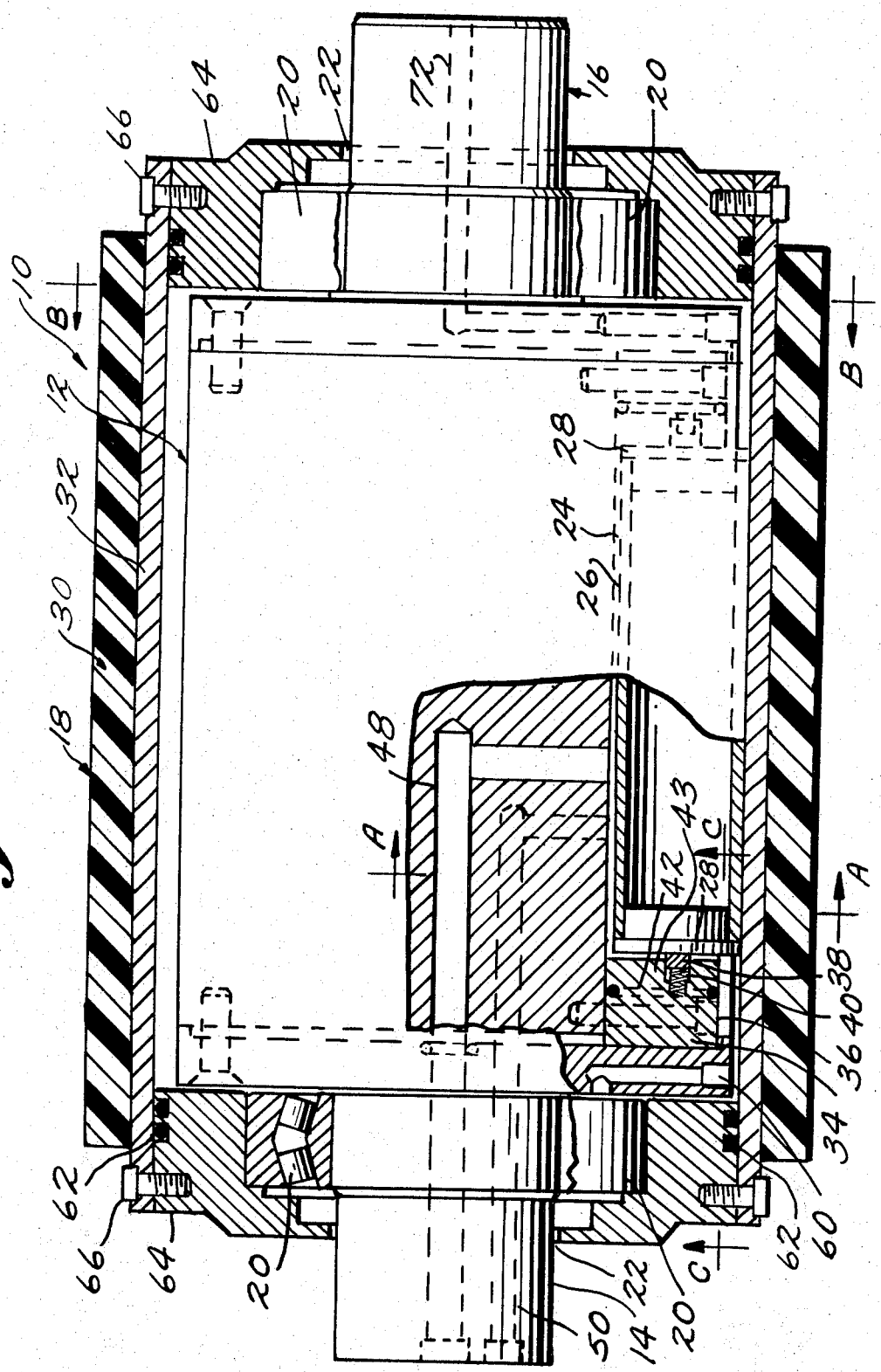
FIG. 1 is a fragmented sectional front elevation of a roll.

FIG. 1 shows a roll 10 for applying uniform pressure to a web of material comprising a stationary inner structure 12 mounted between two supporting shafts 14 and 16. A cylindrical outer structure 18 is rotatably mounted on the shafts 14 and 16. Various types of self-aligning bearings 20, with associated lubricant seals 22 provide a means for rotatably mounting the outer structure 18 on shafts 14 and 16. FIG. 1 is a fragmented view of the roll 10 which may be of any suitable length.

A slot 24 is defined by the stationary inner structure 12 and preferably extends substantially throughout its length. The slot 24 extends longitudinally along the inner structure 12 parallel to the axis of rotation of the outer structure 18. Disposed within the slot 24 is a metal tube or roller 26. If the inner roller 26 is a tube, the ends may be sealed by means of heads 28.

The outer structure 18 comprises a metal drum 32 made out of any suitable metals such as steel, brass or ductile iron which has a rubber covering 30. Rubber covering 30 is used to aid in the extraction of liquid from the web.

As can be seen from FIG. 2, inner roller 26 is parallel to the axis of rotation of the outer structure 18 and contacts the inside surface of the metal drum 32.

Figure 4:
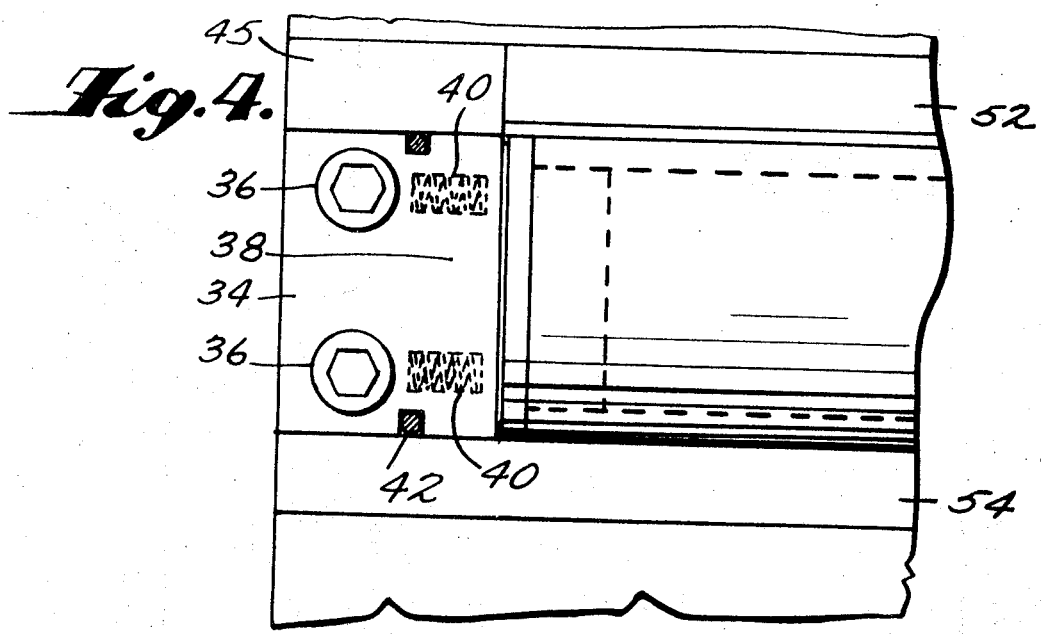
FIG. 4 is a section of the roll as shown in FIG. 1 from the bottom of the roll taken along line C—C.

The inner roller 26 is secured in the slot 24 by means of end blocks 34 which are bolted into the stationary roll 12 by bolts 36. Roller 26 is mounted for rotation in slot 24 by bearing against bars 38 on either end which are made of any suitable bearing material. As shown in FIG. 4, bearing bar 38 is spring loaded in end block 34 by means of two springs 40.

As illustrated in FIGS. 2 and 4, a sealed hydraulic chamber is maintained between inner roller 26 and stationary roll 12 in the slot 24. This sealed hydraulic chamber is maintained by the end blocks 34 and corresponding seals 42, stationary bearing material 54 and movable bearing material 52. Along with movable bearing material 52 there is also an additional piece of bearing material 58. All bearing materials 38, 52, 54, and 58 are made of any suitable bearing material such as Teflon or bronze, and run substantially the length of inner roller 26. As shown in FIG. 4, movable seal 52 corresponds approximately to the length of inner roller 26 and is positioned on either end by means of a stationary end block 45. Stationary bearing material 54 runs substantially the length of the slot 24. Stationary bearing material 54 is held in place by means of a bolt 56 which positions the stationary seal 54 to the inner roller 12 and is further sealed by means of seal 57. Together, end blocks 34 and seals 52 and 54 form a rectangular seal around the inner roller within the slot 24.

In order to fill and pressurize the hydraulic chamber 24, passageway 48 is provided to feed the fluid into the chamber. An additional passageway 50 is provided for the hydraulic fluid in order to activate and move the movable seal 52. In normal operation, the movable seal 52 will be activated first and then the hydraulic chamber will be filled by passageway 48; however, it is not necessary that the seal be activated first.

The rotating outer structure 18 is bolted to the rotating end blocks 64 by means of bolts 66. Seals 62 are provided between the outer roller 18 and the rotating end block 64 in order to prevent leakage of the hydraulic fluid outside the roll. The hydraulic fluid that leaks or escapes from the hydraulic chamber 24 is maintained at the level 70 shown in FIG. 3 between the stationary inner structure 12 and the rotatable outer roller 18 by means of return fluid passage 72. The bearings 20 are lubricated by means of lubricating tube 60 which, due to rotation of the outer shell, draws part of the hydraulic fluid 74 up into the bearings. In this manner, the bearings are continuously lubricated and the hydraulic fluid is contained in hydraulic chamber 24 while any excess which leaks out is drawn off by passage 72 if the fluid reaches above the line 70.

It is important that the structure of the roll 10 causes uniform pressure to be applied to another roll or other opposing surface contacted by the roll at all points throughout the length of the roll 10. This pressure is uniform despite any tendency of inner or outer structure to bend or deflect because the pressure throughout the hydraulic chamber 24 is equal at all points along the surface of inner roller 26 which in turn transmits the uniform pressure to the rotatable outer structure 18. As shown in FIG. 2, the pressure in the hydraulic chamber 24 controls the amount of pressure transmitted from inner roll 26 to outer metal structure 32. This pressure is contacted from the broader area of the upper surface of inner roller 26 to the smaller area of contact at point 80 between inner roller 26 and outer structure 32. In this manner, a sharper more precise uniform pressure is maintained and transmitted through rotating structure 18 and thereby obtains a sharper more uniform pressure which was not attained in the prior art.

An apparatus for applying uniform pressure to a web of material comprising two cooperating rolls, one or both of which may be of the type described above, is shown in FIG. 6. A first roll 82 is supported in a fixed position and rotatably mounted on a supporting structure 90. A second roll 84 is mounted on either end on a beam 92 which is pivotably attached to the supporting structure 90 at 88. A means 94 is provided for applying forces to each of the beams 92 which in turn transmits the force to roll 84 thus forcing the two rolls 82 and 84 together. The force applying means 94 is connected to the beams 92 at point 98 in order to cause the beams 92 to pivot about 88 on the supporting structure 90. As force applied is increased, the spacing between the rolls 82 and 84 is reduced and the pressure is thus increased. This causes the roll 84 to apply pressure to the opposing surface of the roll 82 as determined by the force applied to the supporting shafts of roll 84 which are mounted on beams 92. It will be appreciated that the rolls shown in FIG. 6 may be employed in various positions, such as horizontal or angled.

Figure 5:
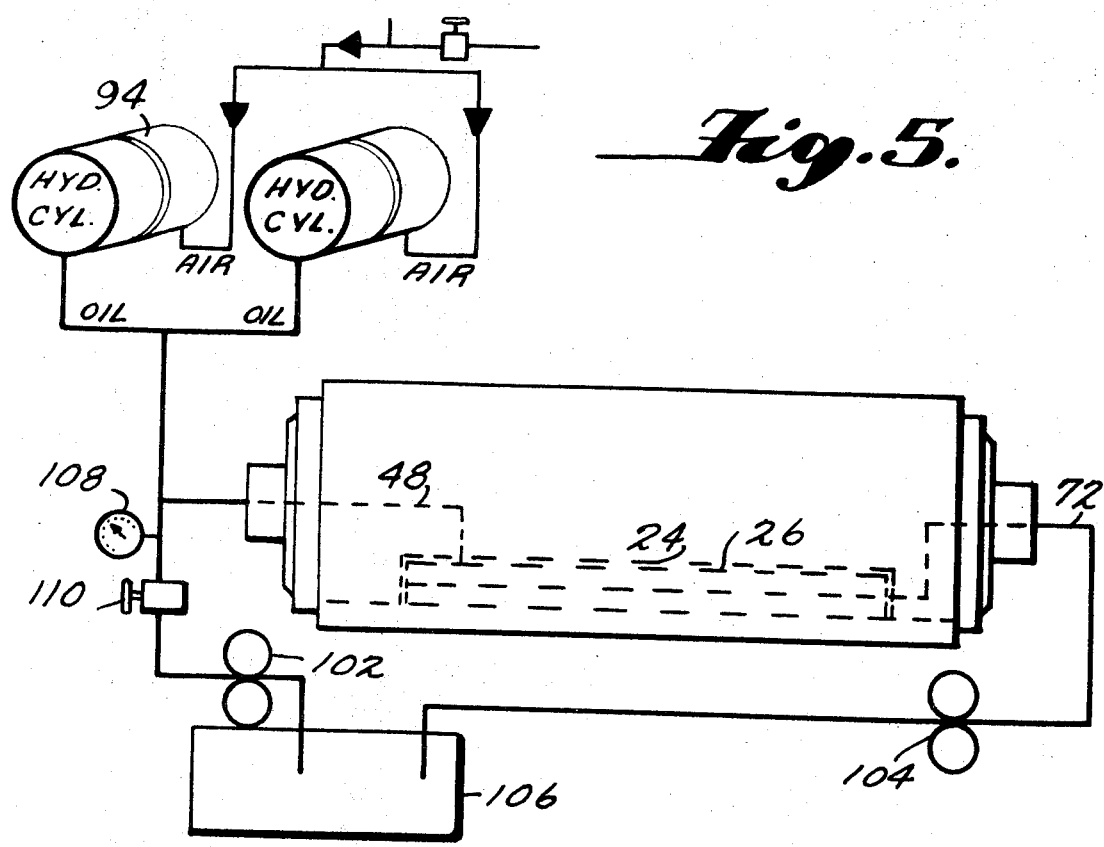
FIG. 5 is a schematic of the control system for the roll of FIG. 1.
Figure 6:
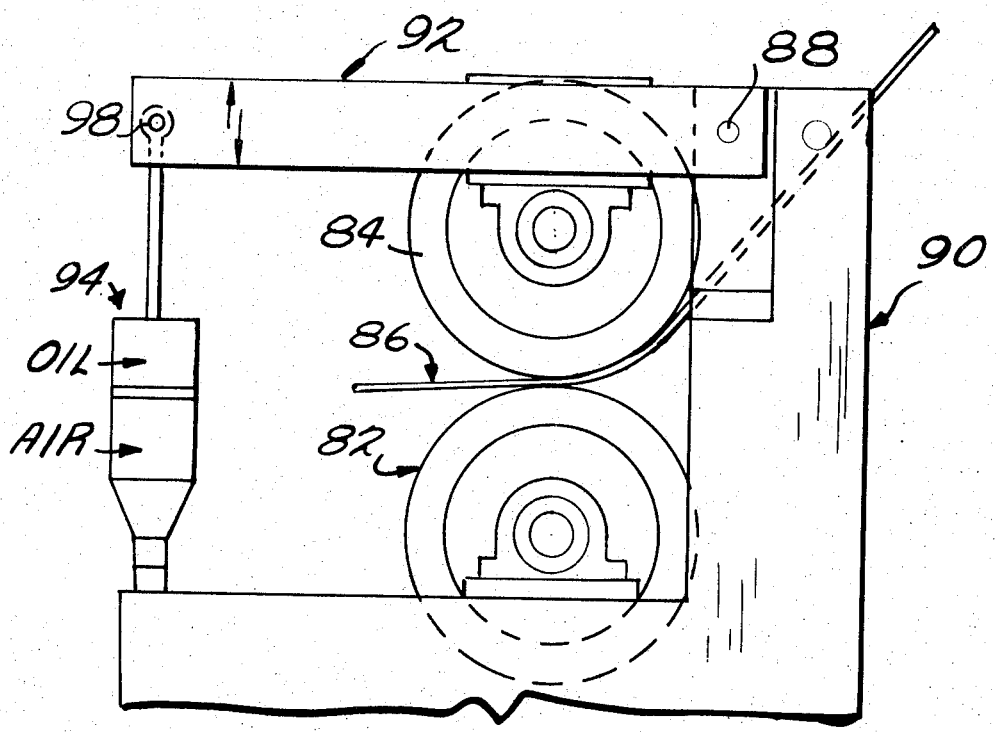
FIG. 6 is a side elevation of an apparatus employing the roll of the type shown in FIG. 1.

The two force applying means 94 are shown in schematic as hydraulic cylinders 94 in FIG. 5. These hydraulic cylinders 94 control the pressure applied between roller 26 and outer structure 18 and the pressure between rollers 82 and 84 as shown in FIG. 6. The hydraulic fluid is circulated from reservoir 106 by means of pump 102. The pressure is controlled by valve 110 and gauge 108. The hydraulic fluid is returned to reservoir 106 by means of return passage 72 and pump 104. The hydraulic cylinders 94 are dual-acting cylinders wherein the oil pressure in the cylinders 94 and chamber 24 are equal at all times, the oil pressure being controlled by valve 110 and gauge 108. The counter pressure against the roll pressure in the dual-acting cylinders is provided by air, or any other suitable fluid, as shown in FIGS. 5 and 6. The oil pressure and air counter pressure may be established so that there will be no deflection of roll 84 and the pressure applied by the roll 84 will be uniform with respect to the material 86. If only the air counter pressure is increased in the cylinders 94, the relationship between the oil pressure and air counter pressure is altered with a resulting deflection or bending in the roll. In this manner, by the intentional downward deflection of upper roller 84, the dye of wet center fabrics may be uniformly removed across the whole width of the web or textile material. These dual hydraulic cylinders also are used to counter-balance the weight of the roll, and therefore the pressure applied to the web or textile material is a result of the uniform hydraulic pressure in the hydraulic chamber 24 and cylinders 94.

It will be appreciated that this roll structure is a modification of the previously mentioned U.S. Pat. No. 3,638,292, which is hereby incorporated by reference, and can be used in a similar fashion in textile processing, paper pulp processing or other suitable processes.

What is claimed is:

1. A roll for applying pressure to an opposing surface comprising two shafts, a stationary inner structure mounted between the shafts, a slot extending substantially throughout the length of the inner structure, a rotatable outer cylinder surrounding the inner structure, means mounted on each shaft to rotatably support the outer cylinder, an inner roller disposed within the slot defined in the inner structure, said slot being substantially parallel to the axis of rotation of the outer cylinder, means for sealing the inner roller in the slot to form a chamber adapted to contain a pressurizing fluid, a fluid passage means for supplying fluid through one of the shafts into the chamber, said chamber and inner structure being adapted by the force of the fluid to urge the inner roller against an inner surface of the rotatable outer cylinder, and means for applying a force to the roll whereby the outer cylinder is urged toward the opposing surface.

2. The apparatus of claim 1 wherein the outer cylinder has an outer rubber coating.

3. The apparatus of claim 1 wherein the means for sealing the inner roller in the slot comprises two end blocks, longitudinally movable and stationary seals which are substantially parallel to the axis of rotation of the outer roller and which together with the end blocks and the slot form the chamber.

4. The apparatus of claim 1 wherein the means mounted on each shaft to rotatably support the outer cylinder comprises self-aligning bearings and an oil lubricating tube which is adapted to transmit the fluid from the inner surface of the outer cylinder to the bearings.

5. The apparatus of claim 1 wherein the means for applying a force to the roll comprises at least one rotatable beam and at least one dual-acting hydraulic cylinder, and means are provided to control the dual-acting hydraulic cylinder and the pressure of the fluid in the chamber.

6. The apparatus of claim 1 wherein the opposing surface comprises a stationary roll.

7. A roll for applying a pressure to an opposing stationary roll, the roll for applying pressure comprising two shafts, a stationary inner structure mounted between the shafts, a slot extending substantially throughout the length of the inner structure, a rotatable outer cylinder surrounding the inner structure, means mounted on each shaft to rotatably support the outer cylinder, means in the slot for applying pressure to the inner surface of the outer cylinder, a stationary means for supporting each shaft of the roll for applying pressure in a movable manner, means for applying a force to the roll for applying pressure which independently controls the pressure on the inner surface of the outer cylinder from the slot and the force between the roll for applying pressure and the stationary roll so that the amount of deflection may be controlled.

8. A roll for applying pressure to an opposing surface comprising two shafts, a stationary inner structure mounted between the shafts, a slot extending substantially throughout the length of the inner structure, a rotatable outer cylinder surrounding the inner structure, means mounted on each shaft to rotatably support the outer cylinder, an inner roller disposed within the slot defined in the inner structure, said slot and inner roller being substantially parallel to the axis of rotation of the outer cylinder, means for sealing the inner roller in the slot to form a chamber between the rotating surface of the inner roller and the surfaces of the slot, means for pressurizing the chamber with fluid, said means including a fluid supply passage extending through the inner structure and communicating with the chamber, whereby the inner roller can be urged against the inner surface of the rotatable outer cylinder to force the latter toward the opposing surface.

* * * * *